（12） United States Patent
Pacejo et al.

(10) Patent No.: US 9,442,782 B2
(45) Date of Patent: Sep. 13, 2016

(54) SYSTEMS AND METHODS OF INTERFACE DESCRIPTION LANGUAGE (IDL) COMPILERS

(71) Applicant: Corero Networks Security, Inc., Hudson, MA (US)

(72) Inventors: Christopher T. Pacejo, Lenox, MA (US); Thomas J. Teixeira, Harvard, MA (US)

(73) Assignee: Corero Networks Security, Inc., Hudson, MA (US)

( * ) Notice: Subject to any disclaimer, the term of this patent is extended or adjusted under 35 U.S.C. 154(b) by 0 days.

(21) Appl. No.: 14/610,631

(22) Filed: Jan. 30, 2015

(65) Prior Publication Data

US 2015/0220375 A1   Aug. 6, 2015

Related U.S. Application Data

(60) Provisional application No. 61/934,510, filed on Jan. 31, 2014.

(51) Int. Cl.
*G06F 9/54* (2006.01)
*G06F 9/445* (2006.01)
*G06F 9/44* (2006.01)

(52) U.S. Cl.
CPC .............. *G06F 9/547* (2013.01); *G06F 8/30* (2013.01); *G06F 9/44505* (2013.01)

(58) Field of Classification Search
CPC ....... G06F 9/547; G06F 9/44505; G06F 8/30
See application file for complete search history.

(56) References Cited

U.S. PATENT DOCUMENTS

| | | | |
|---|---|---|---|
| 6,728,788 B1 * | 4/2004 | Ainsworth | G06F 9/547 719/330 |
| 2003/0140180 A1 * | 7/2003 | Brown | G06F 9/547 719/330 |
| 2014/0096148 A1 * | 4/2014 | Yakovenko | G06F 9/547 719/330 |

* cited by examiner

*Primary Examiner* — Syed Roni
(74) *Attorney, Agent, or Firm* — Goodwin Procter LLP

(57) ABSTRACT

An interface description language (IDL) compiler generates a descriptor for invoking a method implemented by a software component or a target unit by source units, where the descriptor customizes the invocation by one or more source units based on, at least in part, whether a respective source unit and the target unit are mapped to the same core or to different cores, as specified by a unit-core map. Additionally or in the alternative, the invocation may depend on whether the method is synchronous, asynchronous, or unspecified. Using the unit-core map, a channel associated with a method may be monitored efficiently by avoiding monitoring of the source units that are mapped to the same core as the target unit is.

22 Claims, 4 Drawing Sheets

X1 : m1 (Synchronous)

A1  :  R, CH1
    B2  :  R, CH1
    B1  :  D
    X1  :  D
    X2  :  R, CH1

X2 : m1 (Synchronous)

A1  :  R, CH1
    B2  :  D
    B1  :  R, CH1
    X1  :  R, CH1
    X2  :  D

X1 : m2 (Asynchronous)

A1  :  R, CH2
    B2  :  R, CH2
    B1  :  R, CH2
    X1  :  R, CH2
    X2  :  R, CH2

X2 : m2 (Asynchronous)

```
                                    f1
                                    I1
                                CHL1 : Y, Z

Y1                          Y2
                                                    D2
        D1      Z1                  Z2

S1                          S2

Y1 : f1 (Synchronous)               Y2 : f1 (Synchronous)

Y1  :  Direct                       Y1  :  Remote, CHL1
    D1  :  Direct                       D1  :  Remote, CHL1
    Y2  :  Remote, CHL1                 Y2  :  Direct
    D2  :  Remote, CHL1                 D2  :  Direct
    Z2  :  Remote, CHL1                 Z2  :  Direct
    Z1  :  Direct                       Z1  :  Remote, CHL1

Z1 : f1 (Synchronous)

Y1  :  Direct
    D1  :  Direct
    Y2  :  Remote, CHL1
    D2  :  Remote, CHL1
    Z2  :  Remote, CHL1
    Z1  :  Direct
```

P2 : X1 : m1 : CH1

Monitor : {A1, B2, X2}

P2 : X1 : m2 : Ch2

Monitor : {A1, B1, B2, X1, X2}

P3 : X2 : m1 : CH1

Monitor : {A1, B1, X1}

P3 : X2 : m2 : CH2

Monitor : {A1, B1, B2, X1, X2}

Function Map : X1 : m1 ← (B1, B2)

Monitor : {B2}

Function Map : X2 : m2 ← (A1, B2, X1)

Monitor : {A1, B2, X1}

FIG. 4

SYSTEMS AND METHODS OF INTERFACE DESCRIPTION LANGUAGE (IDL) COMPILERS

CROSS-REFERENCE TO RELATED APPLICATIONS

This application claims priority to and the benefit of, and incorporates herein by reference in its entirety, U.S. Provisional Patent Application No. 61/934,510, entitled "IDL Compiler System and Method," which was filed on Jan. 31, 2014.

FIELD OF THE INVENTION

This disclosure generally relates to distributed computing and, more particularly to techniques for optimizing the execution of different software components on a distributed computer.

BACKGROUND

In many modern systems, various operations and/or algorithms are executed by one or more instances of one or more software components. Typically, a software component implements or provides a certain functionality, which may be used in the overall computations performed by the system. Different components may provide different beneficial functionalities. Depending on the computation needs, one or more instances, i.e., copies, of one or more software components may be used for the overall computations/processing. Some of these component instances can operate on respective data independently of each other, and some component instances may exchange data, partial results, etc., with one another, and may thus depend on each other. As such, some component instances may execute in parallel, i.e., concurrently, either entirely or at least in part, and some component instances may execute sequentially.

While in some systems all software component instances can be implemented using a single hardware processing module (also called a core), a typical system includes a number of cores to facilitate parallel execution of various component instances, which can improve the overall performance of the system. Each core may implement one or more instances of a single or several different software components (also called units). A scheduler can designate or map various units and/or unit instances to different cores, for example, according to certain design constraints, to improve overall utilization of the available cores, etc. The result of the mapping can be expressed as unit-core map, indicating which units and/or unit instances are designated to each core.

In a typical multi-core system, all instances of a unit that exchange data with other instances of the same unit or instances of different units use the same communication mechanism, regardless of whether the two communicating instances are mapped to the same core. One of the reasons for this is that a unit is generally specified without the knowledge of the unit-core map, and all instances of a particular unit are, in substance, copies of that unit. Therefore, the unit and, hence, the corresponding instances, include the only communication mechanism that can facilitate communication between two instances regardless of the mapping of those instances. This can lead to inefficient, slow communication in many situations.

SUMMARY

Various embodiments of systems and methods described herein facilitate efficient and effective distributed computing. This is achieved, in part, by providing an interface description language compiler system that can customize communication between two unit instances by including in those components a stub that can take into consideration whether the two instances are mapped to the same core or to different cores. The compiler system can account for the nature of the communication as well. Specifically, if one instance is to invoke a synchronous method implemented by another instance, and if the two instances are mapped to the same core, compilation of the stub provided by the other instance may result in a direct invocation, which is generally faster and/or requires fewer computation and communication resources. If the two instances are mapped to two different cores, however, the provided stub may result in a remote invocation, permitting communication between the two instances. If the mapping changes, the compiler can regenerate the stub using the updated unit-core map, and can then reselect a suitable communication mechanism. The channel monitoring can also be optimized using the unit-core maps and/or historical information about the usage of the methods implemented by various units.

Accordingly, in one aspect, a method for facilitating inter-unit communication includes receiving a unit-core mapping that includes a mapping of a target unit instance to one of several cores and a mapping of each source unit instance in a set of source units instances to one core in the several cores. The method also includes receiving a specification of the target unit, specifying a function thereof and a channel associated with the function. In the context of modern programming languages it is common to refer to the functionalities provided by various units (e.g., software components, objects, etc.) as methods. The term "function" is used herein, however, to avoid confusion with the claimed methods. The method further includes building a descriptor for accessing the function of the target unit. The building step includes generating one statement corresponding to each source unit instance in the set of source units instances. The statement is based on, at least in part, a core to which that source unit instance is mapped according to the unit-core mapping.

In some embodiments, a first source unit instance in the set of source units instances is mapped to a first core, a second source unit instance in the set is mapped to a second, different core, and the target unit instance is mapped to the second core. As such, the building step includes generating a first statement that is associated with the first unit instance and that includes a remote call using the channel associated with the function. The building step also includes generating a second statement that is associated with the second unit instance and including a direct call, excluding a reference to the channel.

In some embodiments, the method further includes a subsequent compilation step that includes identifying a source unit instance invoking the function, and excluding from a compiled code corresponding to the descriptor any statement not corresponding to the source unit instance invoking the function. The function of the target unit may have a property and each generated statement may be further based on, at least in part, the property of the function. The function property may indicate whether the function is synchronous, asynchronous, or unspecified. Each generated statement may include a remote call using the channel associated with the function, if the property is asynchronous. The channel may be associated with an underlying transport.

In another aspect, a method for facilitating inter-unit communication includes receiving an interface having a function and a set of target units providing the function. The method also includes receiving a unit-core mapping that has a mapping of each instance of each target unit in the set of target units to one of the several cores, and a mapping of each source unit instance in a set of source units instances to one of the several cores. The method also includes building a descriptor for accessing the function of the interface. The building step includes generating one statement corresponding to each source unit instance in the set of source units instances, where the statement is based on, at least in part, a core to which that source unit instance is mapped according to the unit-core mapping and a core to which each instance of each target unit in the set of target units is mapped according to the unit-core mapping.

In another aspect, a method for facilitating inter-unit communication includes receiving a unit-core mapping that includes a mapping of each unit instance in a set of units instances to one core in a number of cores. The method also includes selecting a core from the several cores, and identifying: (i) a target set of units instances mapped to the selected core, and (ii) a source set of units instances mapped to any core other than the selected core. The method further includes deriving a list of channels that includes a channel corresponding to each function provided by each unit instance in the target set. For each channel in the list, the method includes building an iterator that includes a sequence of monitors for monitoring access to a function corresponding to the channel by generating a monitor for each unit instance in the source set. As the source set of units does not include any units instances mapped to the selected core, the iterator can execute efficiently, by not monitoring units instances that can directly invoke the function associated with the channel, without using the channel. The building step may further generate a monitor for each unit instance in the target set if a type of the function corresponding to the channel is asynchronous.

In some embodiments, the method includes receiving a function mapping including a function of each unit instance in the target set and a corresponding listing of each source unit instance configured to invoke the function of that unit instance. Prior to the building step, the source set may be updated by excluding therefrom any source unit instance that is not listed in the listing in the function mapping. As such, the efficiency of the iterator can be increased further, because the iterator need not monitor any source unit that is known not to invoke a function associated with the channel. The function mapping may include a call frequency associated with each source unit instance in the listing, and the method may further include ordering the sequence of monitors according to a call frequency of each source unit instance in the updated source set.

In another aspect, a computer system includes a first processor and a first memory coupled to the first processor. The first memory includes instructions which, when executed by a processing unit that includes the first processor and/or a second processor and that is in electronic communication with a memory module that includes the first memory and/or a second memory, program the processing unit, for facilitating inter-unit communication, to receive a unit-core mapping that includes a mapping of a target unit instance to one of several cores and a mapping of each source unit instance in a set of source units instances to one core in the several cores. The instructions also program the processing unit to receive a specification of the target unit, specifying a function thereof and a channel associated with the function. The instructions further program the processing unit to build a descriptor for accessing the function of the target unit. To this end, the instructions program the processing unit to generate one statement corresponding to each source unit instance in the set of source units instances. The statement is based on, at least in part, a core to which that source unit instance is mapped according to the unit-core mapping. In various embodiments, the instructions can program the processing unit to perform one or more of the method steps described above.

In another aspect, a computer system includes a first processor and a first memory coupled to the first processor. The first memory includes instructions which, when executed by a processing unit that includes the first processor and/or a second processor and that is in electronic communication with a memory module that includes the first memory and/or a second memory, program the processing unit, for facilitating inter-unit communication, to receive an interface having a function and a set of target units providing the function. The instructions also program the processing unit to receive a unit-core mapping that has a mapping of each instance of each target unit in the set of target units to one of the several cores, and a mapping of each source unit instance in a set of source units instances to one of the several cores. Moreover, the instructions program the processing unit to build a descriptor for accessing the function of the interface. To build the descriptor, the instructions program the processing unit to generate one statement corresponding to each source unit instance in the set of source units instances, where the statement is based on, at least in part, a core to which that source unit instance is mapped according to the unit-core mapping and a core to which each instance of each target unit in the set of target units is mapped according to the unit-core mapping. In various embodiments, the instructions can program the processing unit to perform one or more of the method steps described above.

In another aspect, a computer system includes a first processor and a first memory coupled to the first processor. The first memory includes instructions which, when executed by a processing unit that includes the first processor and/or a second processor and that is in electronic communication with a memory module that includes the first memory and/or a second memory, program the processing unit, for facilitating inter-unit communication, to receive a unit-core mapping that includes a mapping of each unit instance in a set of units instances to one core in a number of cores. The instructions also program the processing unit to select a core from the several cores, and to identify: (i) a target set of units instances mapped to the selected core, and (ii) a source set of units instances mapped to any core other than the selected core. Additionally, the instructions program the processing unit to derive a list of channels that includes a channel corresponding to each function provided by each unit instance in the target set. For each channel in the list, the instructions program the processing unit to build an iterator that includes a sequence of monitors for monitoring access to a function corresponding to the channel by generating a monitor for each unit instance in the source set. In various embodiments, the instructions can program the processing unit to perform one or more of the method steps described above.

These and other objects, along with advantages and features of the embodiments disclosed herein, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 2 shows direct and via channel invocation of methods provided by various units, according to one embodiment;

FIG. 4 depicts various examples of channel monitoring, according to certain embodiments.

DETAILED DESCRIPTION

Figure 1:
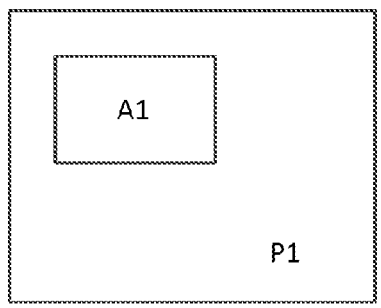
FIG. 1 schematically depicts an exemplary unit-core mapping.
Figure 1:
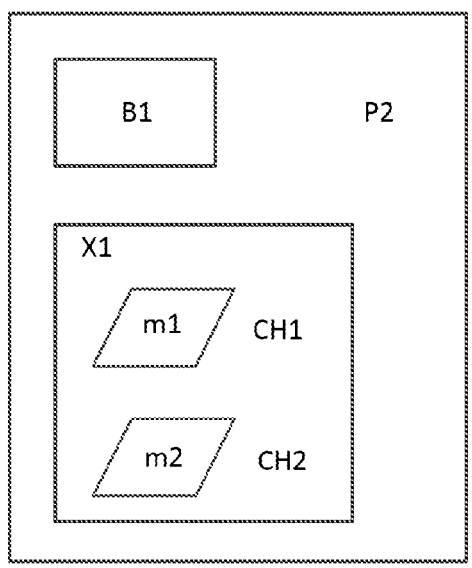
Figure 1:
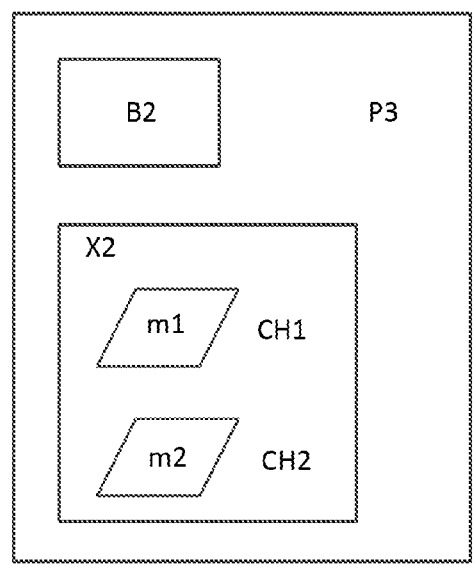

Various terms used throughout this disclosure are defined as follows:

Application: a cohesive set of computer code, written in the target language, which may utilize an IDL compiler and may execute on the target platform.

Channel: a logical queuing domain through which methods can be invoked. Depending on the context, an invocation of a method can be performed by an instance of a unit implementing the method, or can be performed by an instance of a unit that does not implement the method. In some embodiments, all invocations, by a given unit instance, of all methods on a second unit instance assigned to a given channel take effect in the order of invocations. Channels are typically ordered by channel priority. Thus, in some embodiments, all invocations of any methods assigned to a given channel can be guaranteed against starvation due to invocations of any methods assigned to a channel of lower priority.

Channel mapping: a description of which channel should be used to invoke a particular method.

Compilation directive: an instruction which is given to the target compiler to control the compilation of one or more segments of computer code.

Direct call: in a segment of computer code written in the target language, termed the caller, an instruction which instructs the target platform to switch, in an efficient manner, control to another indicated segment of code, termed the callee, returning control to the caller upon completion.

Dispatch loop: a segment of computer code, written in the target language, which describes the mechanism by which messages are received from the various transport queues associated with a set of units.

Engine: an executable image targeting the target platform, which may describe a single thread which can execute the dispatch loop for a specified set of units.

Engine instance: a thread of control on the target platform which may execute the program specified by the associated engine.

Engine layout: a description partitioning units into engines, denoting the number of instances of each engine, and the node where each engine instance may be located.

Function: a named, parameterized segment of computer code, written in the target language.

Interface: a named set of methods that are parametric over units and may be implemented by multiple units.

Message: an octet sequence.

Method: a named entry point by which a unit instance may be instructed to transform its associated state by invoking the method on the unit instance. A unit can implement a method for which it has associated method handlers. Each method is associated with a set of formal input and output parameters, to which actual parameters are bound upon invocation or upon completion of processing, respectively. At most one formal input parameter may be specified to indicate upon which instance of the unit the method is to be invoked. A method may be synchronous, asynchronous, or unspecified. In some embodiments, the invocation of a synchronous method is guaranteed not to return control to the invoking unit instance until the associated method handler completes. In some embodiments, the invocation of an asynchronous method is guaranteed to return control to the invoking unit instance regardless of the termination of the associated method handler. The invocation of an unspecified method generally does not provide any of the above guarantees. Only a synchronous method may specify formal output parameters.

Method handler: a segment of computer code, written in the target language, that describes the transformation of unit state which should occur when the associated method is invoked.

Method stub: a segment of computer code, written in the target language, that describes the mechanism by which a method is invoked. The method stub may not specify the behavior of the method ; the behavior may be specified by the method handler. In various embodiments, the formal parameters are identical to those of the associated method, except for the addition of a parameter identifying the invoking (i.e., implementing) unit instance.

Node: a physical or logical location on the target platform at which engine instances may be executed and transport queues may be allocated. Examples of nodes include, but are not limited to, distinct physical cores within a processor, distinct threads within an operating system, or distinct processors on a shared bus.

Optimization hints: optional information provided by the user which may indicate for each unit, which methods it does not invoke (termed non-invokable by the unit); and for each method implemented by the unit, the relative frequency with which that method is invoked, relative to all other methods.

Target compiler: a software tool which transforms code in the target language to code which can be executed on the target platform. In various embodiments, a target compiler is capable of performing certain common code optimizations, including but not limited to constant propagation and dead code elimination.

Target language: the computer language in which at least a significant portion of the application source code is written.

Target platform: the hardware platform on which the application may execute.

Transport a mechanism for transmitting messages between engine instances. Each transport may:

configure the allocation of a number of transport queues located at the node of a given engine instance; the queues may queue messages in first-in-first-out order;

send a message via a transport queue from one engine instance to another or the same, whereby the message is enqueued into the specified transport queue of the destination engine instance, blocking the thread of control of the engine instance if necessary;

pool a transport queue on a given engine instance, whereby the specified transport queue of the specified engine instance can be queried for enqueued messages; and receive a message from a transport queue on a given engine instance from another or the same instance, whereby the message is dequeued from the specified transport queue of the destination engine instance, blocking the thread of control of the engine instance if necessary. Examples of transports include, but are not limited to, inter-core hardware buses, shared memory queues, or TCP/IP streams.

Transport mapping: a description of which transport should service a given channel.

Unit: a named, cohesive set of methods and their handlers, and a description in the target language of the state transformed by the methods, known as the unit state.

Unit instance: a specific instantiation of the unit state of a unit, which may be transformed atomically by the unit's methods.

In a typical use of various embodiments of the IDL compiler described herein, the users may provide one or more of: (i) all units in the application, and their associated methods and method handlers; (ii) all interfaces in the application, and their associated methods; (iii) the implementation of all transports; (iv) the engine layout of the application; (v) a channel mapping; (vi) optimization hints; and (vii) the target compiler.

In response an embodiment of an IDL compiler generates a method stub for each method; and compilation directives and a dispatch loop for each engine. These outputs, together with the rest of the source code of the application, generate, when compiled by the target compiler, the set of engines which can implement the compiled application in which unit instances can communicate efficiently, by taking into consideration at least the nature of the communication and the unit-core map. Compilation directive generation: For each engine, a set of compilation directives may be generated. The directives set may denote, for each unit, whether that unit is contained in the engine, as determined by the engine layout.

In some embodiments, an IDL compiler may generate transport configuration. To this end, for each engine, for every distinct channel to which is assigned in the channel mapping any method implemented by any unit assigned in the engine layout to the engine, the compiler may generate configuration for the transport to allocate a transport queue for the transport to which the channel is mapped in the transport mapping, located at the node to which the engine is located in the engine layout. These are known as request transport queues. In addition, for every distinct transport to which is assigned in the transport mapping a channel to which is assigned in the channel mapping any synchronous method implemented by any unit in the application which is not indicated in the optimization hints as non-invokable by all other units in the engine, the compiler may generate configuration for the transport to allocate a transport queue for the transport, located at the node to which the engine is located in the engine layout. These are known as response transport queues.

Method stub generation: For each unit, for each method associated with the unit, either directly or as part of an interface implemented by the unit, a method stub is generated as follows:

1. Emit a function with a name reflecting that of the unit and method whose formal parameters are those of the method, augmented with a formal input parameter S, identifying the invoking unit instance. Therein:

2. If the method is not asynchronous, emit a conditional statement A, which discriminates, in the case of an interface method, the actual parameter identifying the target unit, or, in the case of a unit method, the name of the unit itself. For each unit which implements the method :
  (a) Emit a branch for the case of A corresponding to the unit implementing the method.
  (b) Therein, emit a conditional statement B, which discriminates the truth of the compilation directive denoting whether the engine under compilation contains the target unit. The efficiency of the code emitted by some target compilers may benefit from this conditional statement because it may be resolvable during a preprocessing phase.
  (c) Emit a branch for the true case of B.
  (d) Therein, emit a conditional statement C, which discriminates the equality of the instance identified by S with the instance identified by the actual parameter identifying on which instance the method should be invoked, or with the instance identified by S if there is no such parameter.
  (e) Emit a branch for the true case of C. Emit a hint which indicates that this branch is likely.
  (f) Therein, emit a direct call to the method handler corresponding to the target unit and method, and assign its formal parameters the values of the corresponding actual parameters of the method stub.

3. Emit code which serializes the actual input parameters of the method stub (including S) and the name of the unit and method as a message M.

4. If the method is that of an interface, emit a conditional statement D which discriminates the actual parameter identifying the target unit. For each unit which implements the method :
  (a) Emit a branch for the case of D corresponding to the unit implementing the method.
  (b) Therein, emit code which assigns to a variable Q a constant expression denoting the transport queue corresponding to the engine which contains the unit implementing the method as determined by the engine layout, the instance identified by the actual parameter identifying on which instance the method should be invoked or the instance identified by S if there is no such parameter, and the transport associated in the transport mapping with the channel associated in the channel mapping with the method.

5. If the method is not that of an interface, emit code which assigns to the variable Q a constant expression denoting the transport queue corresponding to the engine which contains the unit as determined by the engine layout, the instance identified by the actual parameter identifying on which instance the method should be invoked or the instance identified by S if there is no such parameter, and the transport associated in the transport mapping with the channel associated in the channel mapping with the method.

6. Emit a conditional statement E which discriminates the truth of the compilation directive denoting whether the engine under compilation contains the target unit. The efficiency of the code emitted by some target compilers may benefit from this conditional statement because it may be resolvable during a preprocessing phase.

7. Emit a branch for the true case of E.

8. Therein, emit code which sends the message M via the transport queue Q to another or the same engine instance as the one currently executing.

9. Emit a branch for the false case of E.

10. Therein, emit code which sends the message M via the transport queue Q to another but not the same engine instance as the one currently executing.

11. If the method is synchronous:
  (a) Emit code which receives the message R from the executing engine's response transport queue for the transport to which is mapped in the transport mapping the channel to which is mapped in the channel mapping the method.
  (b) Emit code which deserializes the actual output parameters of the method stub from the message R.

Dispatch loop generation: In various embodiments, a dispatch loop is generated for each engine, as follows:

1. Emit a function with one formal parameter indicating which instance of the engine is executing.

2. Therein, emit a first loop. Emit the remainder of the function inside this loop.

3. Emit a second loop. Therein:
  (a) Emit a Boolean-valued variable F initialized to false.
  (b) For each distinct channel to which is assigned in the channel mapping any method implemented by any unit assigned in the engine layout to the engine which is not indicated in the optimization hints as non-invokable by all units assigned to other engines (excepting this engine), in decreasing channel priority order.
    i. Emit a conditional statement A which discriminates the value of F.
    ii. Emit a branch for the false case of A. Emit the remainder of this channel's code inside this branch.
    iii. Emit code which polls the transport queue configured for the engine instance and transport to which is assigned in the transport mapping the channel.
    iv. Emit code which assigns to a message R the truth value of whether the polling detected outstanding messages on the transport queue.
    v. Emit a conditional statement B which discriminates the value of F.
    vi. Emit a branch for the true case of B. Emit a hint which indicates that this branch is likely. Emit the remainder of this channel's code inside this branch.
    vii. Emit code which receives from another but not the same engine instance a message M from the transport queue configured for the engine instance and transport to which is assigned in the transport mapping the channel.
    viii. If there is only one method implemented by any unit assigned in the engine layout to the engine which is not indicated in the optimization hints as non-invokable by all units assigned to other engines (except for this engine), skip to step 3(b)xiii, considering only this method.
    ix. Emit code which deserializes from M the name of the invoked method.
    x. Emit a conditional statement C, which discriminates the name of the invoked method.
    xi. Execute the remainder of this case for each method implemented by any unit assigned in the engine layout to the engine which is not indicated in the optimization hints as non-invokable by all units assigned to other engines (except for this engine).
    xii. Emit a branch for the case of C corresponding to the method. If the optimization hints indicate that the method is invoked more often than all other methods discriminated by C, emit a hint indicating that this branch is likely. Therein, emit the following:
    xiii. If there is only one unit assigned in the engine layout to the engine which implements the method, skip to step 3(b)xviii, considering only this unit.
    xiv. Emit code which deserializes from M the name of the invoked unit.
    xv. Emit a conditional statement D which discriminates the name of the invoked unit.
    xvi. Execute the remainder of this case for each unit assigned in the engine layout to the engine which implements the method.
    xvii. Emit a branch for the case of D corresponding to the unit. If the optimization hints indicate that the invocations of method on the unit account for more invocations than those on other units discriminated by D, emit a hint indicating that this branch is likely. Therein, emit the following:
    xviii. Emit code which deserializes from M the actual input parameters of the method invocation, letting S be the deserialized identity of the invoking unit.
    xix. Emit a direct call to the method handler corresponding to the target unit and method, and assign its formal parameters the values of the deserialized actual parameters.
    xx. If the method is synchronous: (A) Serialize the actual output parameters of the method handler as the message R; (B) Emit a conditional statement E, which discriminates the unit indicated by S; (C) For each unit assigned by the engine mapping to all other engines, for which the method is not indicated non-invokable in the optimization hints, emit a branch for the case of E corresponding to that unit. Therein, assign to Q the transport queue to which the transport mapping maps the channel to which the channel mapping maps the method; (D). Emit code which sends the message R via the transport queue Q to the instance of the engine indicated by S.
  (c) Emit a conditional statement G, which discriminates the value of F.
  (d) Emit a branch for the true case of G. Emit a hint which indicates that this branch is likely.
  (e) Therein, emit code which exits the loop.

4. Emit a third loop. Therein:
  (a) Emit a Boolean-valued variable F initialized to false.
  (b) Follow the procedure outlined in step 3b above, except do not exclude this engine when determining non-invokability of, or when receiving messages associated with, methods which are not synchronous.
  (c) Emit a conditional statement C, which discriminates the value of F.
  (d) Emit a branch for the false case of C. Emit a hint which indicates that this branch is likely.
  (e) Therein, emit code which exits the loop.

With reference to FIG. 1, in an exemplary unit-core mapping, units A, B, and X are mapped to cores P1, P2, and P3. A core may include any processor, server, and a computing device, in general. The unit can be a software module. The unit X provides two methods m1 and m2. The method m1 is synchronous and is associated with channel CH1. The method m2 is asynchronous and is associated with channel CH2. In some embodiments, the type of a method may be unspecified, i.e., the method may be implemented as a synchronous or an asynchronous method.

A unit that provides one or more methods may be called a target unit, because instances of other units (and in some situations, the instances of the target unit itself) may invoke any of the provided methods. All instances of a target unit generally provide all of the methods provided by the target unit and, as such, these instances may be called target unit instances. Any instance of any unit in the mapping may invoke a method provided by a target unit instance. A particular target unit instance may also invoke the method it provides itself. An instance that may invoke a method provided by a target unit instance may be called a source unit instance, and the corresponding unit can be called a source unit.

It should be understood that that the mapping shown in FIG. 1 is illustrative only and that some system configurations may have fewer or more cores (e.g., 2, 10, 64 cores, etc.), and fewer or more units (e.g., 10, 20, 50 units, etc.). There may be one or more instances (e.g., 1, 2, 5, 10, etc.) of each unit, and each unit may provide one or more methods, e.g., up to 5, 10, 16 methods.

Typically, when a unit is designed, all instances thereof copy the unit design. At a certain time during system design, a mapping of the system may become known, i.e., it may be known what unit instances are mapped to each of the cores. If a source unit instance and a target unit instances are both mapped to the same core, the communication therebetween can be improved taking advantage of the fact that both instances are mapped to the same core. As all instances of a particular unit are substantially the same, however, without the benefit of various embodiments of an IDL compiler described herein, any such communication customizations may need to be done manually, after the mapping is known and after the instances are created, which can be tedious and error prone. Also, if the mapping changes subsequently, the customizations must be performed again.

Various embodiments provide descriptors (also called stubs) that can be included in the unit specification so as to enable communication customizations of instances during creation thereof, based on a known mapping. If the mapping changes, a new descriptor/stub, corresponding to the new mapping, can be generated to replace the one previously included in the unit specification. Subsequent compilation of the unit specification (e.g., source code) can compile the updated descriptor/stub to take advantage of the revised mapping, and may create customized unit instances, without having to change the unit specification significantly.

As schematically illustrated with reference to FIG. 2, a descriptor corresponds to a method provided by a target unit instance, and describes how any instance of a source unit can invoke that method. For example, the descriptor for the method m1 provided by the target unit instance X1 describes that source unit instances A1, B2, and X2 may use a remote call using the channel CH1 to invoke the method m1 of the instance X1. A remote call must be used because none of the instances A1, B2, and X2 is mapped to the core P2 to which the instance X1 is mapped, as shown in FIG. 1.

Referring back to FIG. 2, the descriptor for the same method m1 as provided by a different target unit instance X2 describes, however, that the instances B2 and X2 may use a direct call to invoke the method m1 as provided by the instance X2, because all those instances are mapped to the same core P3, as shown in FIG. 1. If a method is asynchronous, regardless of whether the source and target instances are mapped to the same core, a remote call is generally used, as shown in FIG. 2.

Figure 3:
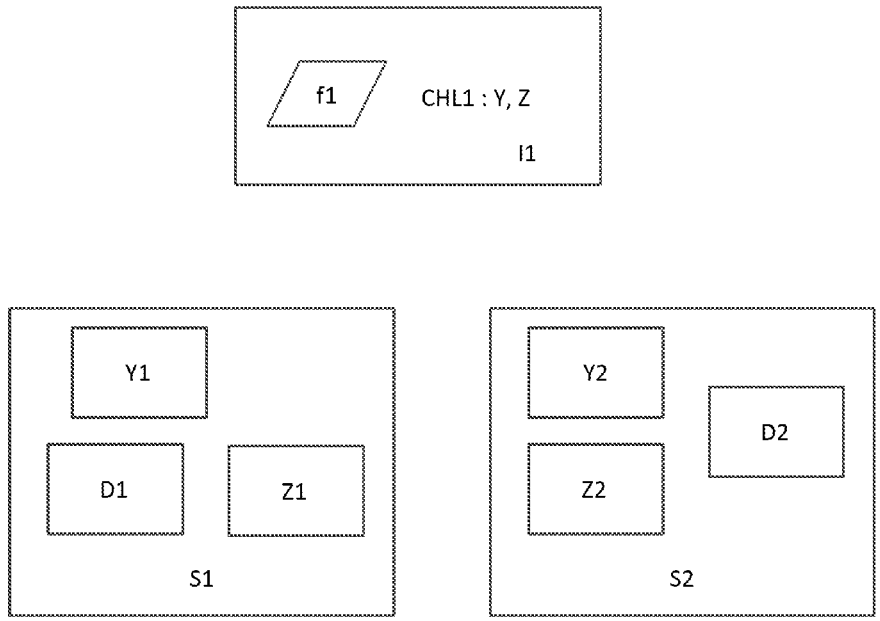
FIG. 3 shows direct and via channel invocation of methods associated with an interface, according to one embodiment.

With reference to FIG. 3, Interface I1 specifies that a method f1 may be provided by units Y and Z. The method f1 is synchronous and the channel CHL1 is associated therewith. Given the mapping of unit instances D1, D2, Y1, Y2, Z1, and Z2 on cores S1 and S2, a descriptor for the method f1 as provided by the interface I1 specifies that with respect to the instance Y1, only the instances Y1, D1, and Z1 may directly invoke the method f1, because all of those instances are mapped to the core S1. With respect to the instances Y2 and Z2, however, only the instances Y2, D2, and Z2 may use a direct call.

These descriptors are included in the specification (e.g., source code) of the units D, Y, and Z. Each instance of these units may duplicate the descriptor. During subsequent compilation of each instance, the compiler may exclude portions of the descriptor that are not relevant to the unit instance being compiled. For example, during the compilation of D1 the subsequent compiler may retain the information that D1 may invoke the method f1 provided by Y1 using a direct call, and to invoke the same method as provided by Y2 and/or Z2, a remote call using channel CHL1 must be used. Even though the compilation of D2 may start with a copy of the same descriptor, the subsequent compiler may only retain the information that a direct call may be used to invoke the method f1 as provided by the instances Y2 and/or Z2, and a remote call may be used only if the method f1 as provided by the instance Y1 is invoked. A direct call is often beneficial relative to a remote call e.g., in terms of overall computation time, data access time, communication bandwidth, etc.

Thus, the descriptor/stub enables efficient communication between units by customizing such communications based on a mapping of choice, while allowing the unit designer to provide a generic specification that can be substantially duplicated according to the number of instances of that unit that may be needed.

Typically, a core must monitor the calls invoking various methods provided by the unit instances mapped to that core, from several unit instances that may not be mapped to that core, so as to service such calls. FIG. 4 illustrates that such monitoring can be optimized using the unit-core mapping. For example, referring back to the unit-core mapping depicted in FIG. 1, only one target unit instance X1 is mapped to the core P2 and the method m1 is synchronous. As such, the core P2 may need to monitor the corresponding channel CH1 for calls from instances A1, B2, and X2 only. This is because the calls from the instances B1 and X1 would be direct and would not be received through the channel CH1 For the channel CH2, however, calls from all unit instances must be monitored, because the method m2 is asynchronous, which generally does not permit direct calls.

If a function map indicating which specific instances may invoke a particular method provided by a target unit instance is available, the monitoring loop can be optimized further. For example, a function map for the method m1 as provided by the instance X1 specifies that only the instances B1, B2, and X1, and not any instances A1 and X2, may invoke the method m1 of X1. As B1 and X1 are mapped to the same core, the loop may monitor for calls from the instance B2 only, and not from instances A1 and X2. For the method m2 as provided by the instance X2, the loop can be similarly optimized using the function map for the method m2 of X2, as shown in FIG. 4. Furthermore, if it is known that the instance B2 may invoke the method m2 of X2 more frequently than the instance X1, and that the instance A1 is least likely to invoke the method m2 of X2, the monitoring in the loop can be ordered as {B2:X1:A1} so as to further improve the efficiency of monitoring.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for facilitating inter-unit communication, the method comprising:
   receiving by a compiler, a user or scheduler supplied unit-core mapping comprising a mapping of a target unit instance to one core in a plurality of cores and a mapping of each source unit instance in a set of source units instances to one core in the plurality of cores;
   receiving by the compiler a specification of the target unit, specifying a function thereof and a channel associated with the function; and
   building by the compiler a descriptor for accessing the function of the target unit, the building step comprising generating one statement corresponding to each source unit instance in the set of source units instances, each respective statement being based on, at least in part, a core to which that source unit instance is mapped according to the user or scheduler supplied unit-core mapping.

2. The method of claim 1, wherein a first source unit instance in the set of source units instances is mapped to a first core, a second source unit instance in the set is mapped to a second, different core, and the target unit instance is mapped to the second core, the building step comprising:
   generating a first statement, associated with the first unit instance, comprising a remote call using the channel; and
   generating a second statement, associated with the second unit instance, comprising a direct call excluding a reference to the channel.

3. The method of claim 1, further comprising a subsequent compilation step, the compilation step comprising:
   identifying a source unit instance invoking the function; and
   excluding from a compiled code corresponding to the descriptor any statement not corresponding to the source unit instance invoking the function.

4. The method of claim 1, wherein the function of the target unit comprises a property and each generated statement is further based on, at least in part, the property of the function.

5. The method of claim 4, wherein:
   the property comprises one of synchronous, asynchronous, and unspecified; and
   each generated statement comprises a remote call using the channel if the property is asynchronous.

6. The method of claim 1, wherein the channel is associated with an underlying transport.

7. A method for facilitating inter-unit communication, the method comprising:
   receiving by a compiler, an interface comprising a function and a set of target units providing the function;
   receiving by the compiler, a user or scheduler supplied unit-core mapping comprising a mapping of each instance of each target unit in the set of target units to one core in a plurality of cores and a mapping of each source unit instance in a set of source units instances to one core in the plurality of cores; and
   building by the compiler a descriptor for accessing the function of the interface, the building step comprising generating one statement corresponding to each source unit instance in the set of source units instances, the statement being based on, at least in part, a core to which that source unit instance is mapped according to the unit-core mapping and a core to which each instance of each target unit in the set of target units is mapped according to the user or scheduler supplied unit-core mapping.

8. A method for facilitating inter-unit communication, the method comprising:
   receiving by a compiler, a user or scheduler supplied unit-core mapping comprising a mapping of each unit instance in a set of units instances to one core in a plurality of cores;
   selecting a core in the plurality of cores;
   identifying by the compiler from the user or scheduler supplied unit-core mapping: (i) a target set of units instances mapped to the selected core, and (ii) a source set of units instances mapped to any core other than the selected core;

deriving by the compiler a list of channels comprising a respective channel corresponding to each function provided by each unit instance in the target set; and for each channel in the list, building by the compiler an iterator comprising a sequence of monitors for monitoring access to a function corresponding to the channel by generating a monitor for each unit instance in the source set.

9. The method of claim 8, wherein the building step further comprises:

adding to the iterator a monitor for a source unit instance that is also mapped to the selected core, if a type of the function corresponding to the channel is asynchronous.

10. The method of claim 8, further comprising:

receiving a function mapping comprising a function of each unit instance in the target set and a corresponding listing of each source unit instance configured to invoke the function of that unit instance; and prior to the building step, updating the source set by excluding therefrom any source unit instance that is not listed in the listing in the function mapping.

11. The method of claim 10, wherein the function mapping comprises a call frequency associated with each source unit instance in the listing, the method further comprising ordering the sequence of monitors according to a call frequency of each source unit instance in the updated source set.

12. A system for facilitating inter-unit communication, the system comprising:

a first processor; and a first memory in electrical communication with the first processor, the first memory comprising instructions which, when executed by a processing unit comprising at least one of the first processor and a second processor, program the processing unit as a compiler to:

receive a user or scheduler supplied unit-core mapping, comprising a mapping of a target unit instance to one core in a plurality of cores and a mapping of each source unit instance in a set of source units instances to one core in the plurality of cores;

receive a specification of the target unit, specifying a function thereof and a channel associated with the function; and build a descriptor for accessing the function of the target unit, by generating one statement corresponding to each source unit instance in the set of source units instances, each respective statement being based on, at least in part, a core to which that source unit instance is mapped according to the user or scheduler supplied unit-core mapping.

13. The system of claim 12, wherein a first source unit instance in the set of source units instances is mapped to a first core, a second source unit instance in the set is mapped to a second, different core, and the target unit instance is mapped to the second core, and the instructions to build the descriptor further program the processing unit to:

generate a first statement, associated with the first unit instance, comprising a remote call using the channel; and generate a second statement, associated with the second unit instance, comprising a direct call excluding a reference to the channel.

14. The system of claim 12, wherein the instruction further program the processing unit to compile the descriptor, wherein the instructions program the processing unit to:

identify a source unit instance invoking the function; and exclude from a compiled code corresponding to the descriptor any statement not corresponding to the source unit instance invoking the function.

15. The system of claim 12, wherein the function of the target unit comprises a property and the instructions further program the processing unit to generate each statement further based on, at least in part, the property of the function.

16. The system of claim 15, wherein:

the property comprises one of synchronous, asynchronous, and unspecified; and each generated statement comprises a remote call using the channel if the property is asynchronous.

17. The system of claim 12, wherein the channel is associated with an underlying transport.

18. A system for facilitating inter-unit communication, the system comprising:

a first processor; and a first memory in electrical communication with the first processor, the first memory comprising instructions which, when executed by a processing unit comprising at least one of the first processor and a second processor, program the processing unit as a compiler to:

receive an interface comprising a function and a set of target units providing the function;

receive a user or scheduler supplied unit-core mapping, comprising a mapping of each instance of each target unit in the set of target units to one core in a plurality of cores and a mapping of each source unit instance in a set of source units instances to one core in the plurality of cores; and build a descriptor for accessing the function of the interface by generating one statement corresponding to each source unit instance in the set of source units instances, the statement being based on, at least in part, a core to which that source unit instance is mapped according to the unit-core mapping and a core to which each instance of each target unit in the set of target units is mapped according to the user or scheduler supplied unit-core mapping.

19. A system for facilitating inter-unit communication, the system comprising:

a first processor; and a first memory in electrical communication with the first processor, the first memory comprising instructions which, when executed by a processing unit comprising at least one of the first processor and a second processor, program the processing unit as a compiler to:

receive a user or scheduler supplied unit-core mapping, comprising a mapping of each unit instance in a set of units instances to one core in a plurality of cores;

select a core in the plurality of cores;

identify from the user or scheduler supplied unit-core mapping: (i) a target set of units instances mapped to the selected core, and (ii) a source set of units instances mapped to any core other than the selected core;

derive a list of channels comprising a respective channel corresponding to each function provided by each unit instance in the target set;

for each channel in the list, build an iterator comprising a sequence of monitors for monitoring access to a function corresponding to the channel by generating a monitor for each unit instance in the source set.

20. The system of claim 19, wherein the instructions to build the iterator further configure the processing unit to add to the iterator a monitor for a source unit instance that is also mapped to the selected core, if a type of the function corresponding to the channel is asynchronous.

21. The system of claim 19, wherein the instructions further program the processing unit to:
receive a function mapping comprising a function of each unit instance in the target set and a corresponding listing of each source unit instance configured to invoke the function of that unit instance; and
prior to the building step, update the source set by excluding therefrom any source unit instance that is not listed in the listing in the function mapping.

22. The system of claim 21, wherein:
the function mapping comprises a call frequency associated with each source unit instance in the listing; and
the instructions further program the processing unit to order the sequence of monitors according to a call frequency of each source unit instance in the updated source set.

* * * * *